US011088641B2

United States Patent
Chen (10) Patent No.: US 11,088,641 B2
(45) Date of Patent: Aug. 10, 2021

(54) MOTOR DRIVING DEVICE HAVING LOCK PROTECTION MODE

(71) Applicant: ANPEC ELECTRONICS CORPORATION, Hsinchu (TW)

(72) Inventor: Kun-Min Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/720,563

(22) Filed: Dec. 19, 2019

(65) Prior Publication Data
US 2021/0075348 A1    Mar. 11, 2021

(30) Foreign Application Priority Data
Sep. 11, 2019 (TW) ................................. 108132795

(51) Int. Cl.
| H02P 6/18 | (2016.01) |
| H02P 6/182 | (2016.01) |
| H02P 8/30 | (2006.01) |
| H02P 3/02 | (2006.01) |
| H02P 7/00 | (2016.01) |

(52) U.S. Cl.
CPC .............. *H02P 6/182* (2013.01); *H02P 3/025* (2013.01); *H02P 8/30* (2013.01); *H02P 7/00* (2013.01)

(58) Field of Classification Search
CPC .. H02P 6/182; H02P 3/025; H02P 7/00; H02P 8/30; H02P 6/15
See application file for complete search history.

(56) References Cited

U.S. PATENT DOCUMENTS

2014/0305987 A1*  10/2014 Parihar ................ A61B 17/282
                                                                227/175.2

* cited by examiner

*Primary Examiner* — Karen Masih
(74) *Attorney, Agent, or Firm* — Li & Cai Intellectual Property (USA) Office (57) ABSTRACT

A motor driving device having a lock protection mode includes a rotation speed detecting unit, an operating unit, a driving unit, a floating point selecting unit, a BEMF detecting unit, a control unit, and a lock protection unit. The operating unit enters an operating mode after a motor is stably operated, and generates an operating signal having phases according to a commutation sequence, and the driving unit drives the motor. The BEMF detecting unit detects a BEMF of a first floating phase to generate a detection result. The control unit outputs a commutation signal to cause the driving unit to drive the motor. When the rotation speed detecting unit determines that a rotation speed of the motor exceeds a predetermined rotation speed, the rotation speed detecting unit outputs a switching signal to the lock protection unit to enter the lock protection mode.

14 Claims, 4 Drawing Sheets

MOTOR DRIVING DEVICE HAVING LOCK PROTECTION MODE

CROSS-REFERENCE TO RELATED PATENT APPLICATION

This application claims the benefit of priority to Taiwan Patent Application No. 108132795, filed on Sep. 11, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor driving device, and more particularly to a motor driving device having a lock protection mode.

BACKGROUND OF THE DISCLOSURE

Direct current (DC) brushless motors are common motors that have advantages of high efficiency, lightness, thinness, shortness, and smallness, and thus are widely used in various fields. In existing electronic products, such as personal computers, notebook computers, communication devices, and household appliances, DC brushless motors are widely used. For example, fan motors for various electronic products and spindle motors for computer storage devices utilize the DC brushless motors. In general, when driving a DC brushless motor, a position of a rotor of the motor must be detected to properly drive commutation switches for performing a commutation procedure.

An existing brushless DC motor system typically includes a three-phase brushless DC motor, a Hall sensor, and a driver. However, since the Hall sensor is easily affected by external environments, a sensing accuracy may be lowered, and may even malfunction in some environments (for example, an environment with an excessive temperature). On the other hand, the brushless DC motor system further includes the Hall sensor, and a volume of the system and manufacturing costs are therefore increased. Therefore, a sensorless driving method without using a sensor is further proposed.

In existing sensorless driving methods, commutation timings are determined by detecting a back electromotive force (BEMF). In order to reduce noises, one of a plurality of phases can be detected as a floating phase, and corresponding BEMF zero points are used for comparison.

However, if the motor is affected by an external force to be locked in a certain position after the motor is started, due to a magnetic circuit present between a rotor and a stator of the motor, the floating phase may induce an erroneous back electromotive force, thereby causing the driving circuit to misjudge that the motor is continuously rotating, and a lock protection mechanism cannot be performed, causing coils of the motor to overheat.

Therefore, there is an urgent need for a motor driving device having a lock protection mode.

SUMMARY OF THE DISCLOSURE

In response to the above-referenced technical inadequacies, the present disclosure provides a motor driving device and method having a lock protection mode.

In one aspect, the present disclosure provides a motor driving device having a lock protection mode for driving a motor, and the motor driving device includes a rotation speed detecting unit, an operating unit, a driving unit, a floating point selecting unit, a back electromotive force detecting unit, a control unit, and a lock protection unit. The rotation speed detecting unit is configured to detect a rotation speed of the motor, and the operating unit is configured to enter an operating mode after the rotation speed detecting unit detects that the motor is stably operated. The operating unit generates an operating signal having a plurality of phases according to a commutation sequence, and the commutation sequence is set according to a predetermined rotation direction of the motor. The driving unit is coupled to the operating unit and the motor, and configured to drive the motor with the plurality of phases. The floating point selecting unit is coupled to the driving unit and the motor, and configured to select a first phase circuit of the motor as a first floating phase in the operating mode. The back electromotive force (BEMF) detecting unit is coupled to the floating point selecting unit and configured to detect whether a back electromotive force (BEMF) of the first floating phase has a first voltage level or a second voltage level to generate a detection result. The control unit is coupled to the BEMF detecting unit and the driving unit and configured to output a commutation signal to the driving unit according to the detection result, thereby causing the driving unit to drive the motor according to the commutation sequence and the commutation signal. The lock protection unit is configured to control the driving unit to enter the lock protection mode in response to receiving a switching signal. The rotation speed detecting unit is configured to determine whether the rotation speed of the motor exceeds a predetermined rotation speed. The rotation speed detecting unit is configured to output, in response to the rotation speed of the motor exceeding the predetermined rotation speed, the switching signal to the lock protection unit, causing the driving unit to enter the lock protection mode, or control the floating point selecting unit to select the first phase circuit and a second phase circuit of the motor as the first floating phase and a second floating phase The BEMF detecting unit is configured to detect the BEMFs of the first floating phase and the second floating phase to determine whether to output the switching signal to the lock protection unit to cause the driving unit to enter the lock protection mode. In the lock protection mode, the driving unit repeatedly drives and stops the motor.

In certain embodiments, the BEMF detecting unit is configured to detect, in response to the rotation speed detecting unit determining that the rotation speed of the motor exceeds the predetermined rotation speed, whether the BEMFs of the first floating phase and the second floating phase have the first voltage level or the second voltage level corresponding to the commutation sequence, and the BEMF detecting unit is configured to, in response to the BEMFs of the first floating phase and the second floating phase not having the first voltage level or the second voltage level corresponding to the commutation sequence, determine to output the switching signal to the lock protection unit to cause the driving unit to enter the lock protection mode.

In certain embodiments, the BEMF detecting unit includes a hysteresis comparator configured to detect whether the BEMF of the first floating phase or the second floating phase is greater than a positive value of a hysteresis voltage or less than a negative value of the hysteresis voltage to generate a high voltage level or a low voltage level.

In certain embodiments, the control unit is configured to set the hysteresis comparator to the first voltage level according to the commutation sequence of the plurality of phases to determine whether the BEMF of the first floating phase or the second floating phase is smaller than the negative value of the hysteresis voltage; or the control unit is configured to set the hysteresis comparator to the second voltage level to determine whether the BEMF of the first floating phase or the second floating phase is greater than the positive value of the hysteresis voltage.

In certain embodiments, when the hysteresis comparator is set to the first voltage level and configured to determine whether the BEMF of the first floating phase or the second floating phase is less than the negative value of the hysteresis voltage, if the BEMF of the first floating phase or the second floating phase is determined to be less than the negative value of the hysteresis voltage, the hysteresis comparator is configured to generate the low voltage level.

In certain embodiments, when the hysteresis comparator is set to the second voltage level and configured to determine whether the BEMF of the first floating phase or the second floating phase is greater than the positive value of the hysteresis voltage, if the BEMF of the first floating phase or the second floating phase is determined to be greater than the positive value of the hysteresis voltage, the hysteresis comparator is configured to generate the high voltage level.

In one aspect, the present disclosure provides a motor driving device having a lock protection mode for driving a motor, and the motor driving device includes a rotation speed detecting unit, an operating unit, a driving unit, a floating point selecting unit, a back electromotive force (BEMF) detecting unit, a control unit, a lock protection unit, and a counting unit. The rotation speed detecting unit is configured to detect a rotation speed of the motor, and the operating unit is configured to enter an operating mode after the rotation speed detecting unit detects that the motor is stably operated. The operating unit generates an operating signal having a plurality of phases according to a commutation sequence, and the commutation sequence is set according to a predetermined rotation direction of the motor. The driving unit is coupled to the operating unit and the motor, and configured to drive the motor with the plurality of phases. The floating point selecting unit is coupled to the driving unit and the motor, and configured to select a first phase circuit of the motor as a first floating phase in the operating mode. The back electromotive force (BEMF) detecting unit is coupled to the floating point selecting unit and configured to detect whether a back electromotive force (BEMF) of the first floating phase has a first voltage level or a second voltage level to generate a detection result. The control unit is coupled to the BEMF detecting unit and the driving unit and configured to output a commutation signal to the driving unit according to the detection result, thereby causing the driving unit to drive the motor according to the commutation sequence and the commutation signal. The control unit is configured to control the BEMF detecting unit to detect the BEMF of the first floating phase after the commutation signal is generated and a mask time elapses. The lock protection unit is configured to control the driving unit to enter the lock protection mode in response to receiving a switching signal. The counting unit is configured to increase a count value when the BEMF detecting unit detects that the commutation signal is generated within a predetermined time after the mask time elapses; and output the switching signal to the lock protection unit in response to the count value being added to a predetermined value to cause the driving unit to enter the lock protection mode; or control the floating point selecting unit to select the first phase circuit and a second phase circuit of the motor as the first floating phase and a second floating phase. The BEMF detecting unit is configured to detect the BEMFs of the first floating phase and the second floating phase to determine whether to output the switching signal to the lock protection unit, causing the driving unit to enter the lock protection mode. In the lock protection mode, the driving unit repeatedly drives and stops the motor.

In certain embodiments, when the count value is added to a predetermined count value, the BEMF detecting unit is configured to detect whether the BEMFs of the first floating phase and the second floating phase have the first voltage level or the second voltage level corresponding to the commutation sequence. The BEMF detecting unit is configured to determine to output the switching signal to the lock protection unit to cause the driving unit to enter the lock protection mode in response to the BEMFs of the first floating phase and the second floating phase not having the first voltage level or the second voltage level corresponding to the commutation sequence.

In certain embodiments, the BEMF detecting unit includes a hysteresis comparator configured to detect whether the BEMF of the first floating phase or the second floating phase is greater than a positive value of a hysteresis voltage or less than a negative value of the hysteresis voltage to generate a high voltage level or a low voltage level.

In certain embodiments, the control unit is configured to set the hysteresis comparator to the first voltage level according to the commutation sequence of the plurality of phases to determine whether the BEMF of the first floating phase or the second floating phase is smaller than the negative value of the hysteresis voltage; or the control unit is configured to set the hysteresis comparator to the second voltage level to determine whether the BEMF of the first floating phase or the second floating phase is greater than the positive value of the hysteresis voltage.

In certain embodiments, when the hysteresis comparator is set to the first voltage level and configured to determine whether the BEMF of the first floating phase or the second floating phase is less than the negative value of the hysteresis voltage, if the BEMF of the first floating phase or the second floating phase is determined to be less than the negative value of the hysteresis voltage, the hysteresis comparator is configured to generate the low voltage level.

In certain embodiments, when the hysteresis comparator is set to the second voltage level and configured to determine whether the BEMF of the first floating phase or the second floating phase is greater than the positive value of the hysteresis voltage, if the BEMF of the first floating phase or the second floating phase is determined to be greater than the positive value of the hysteresis voltage, the hysteresis comparator is configured to generate the high voltage level as the detection result.

In certain embodiments, the counting unit is configured to receive a clock signal, and use a period of the clock signal as the predetermined time after the mask time elapses.

In certain embodiments, the counting unit is configured to receive a clock signal, and use a time duration from an end of the mask time to a first rising edge or a first falling edge appearing in the clock signal as the predetermined time.

Therefore, the motor driving device having the lock protection mode provided by the present disclosure can directly enter the lock protection mode when the rotation speed exceeds the predetermined rotation speed to control the driving unit to repeatedly drive and stop the motor, so as to try to push the motor to be unlocked, while ensuring that a temperature of the motor varies within a safe range to avoid damage to the motor caused by overheating. Alternatively, the floating point selecting unit can be controlled to select two of the phase circuits of the motor to be detected, thereby correctly determining whether the motor is locked to determine whether to enter the lock protection mode.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
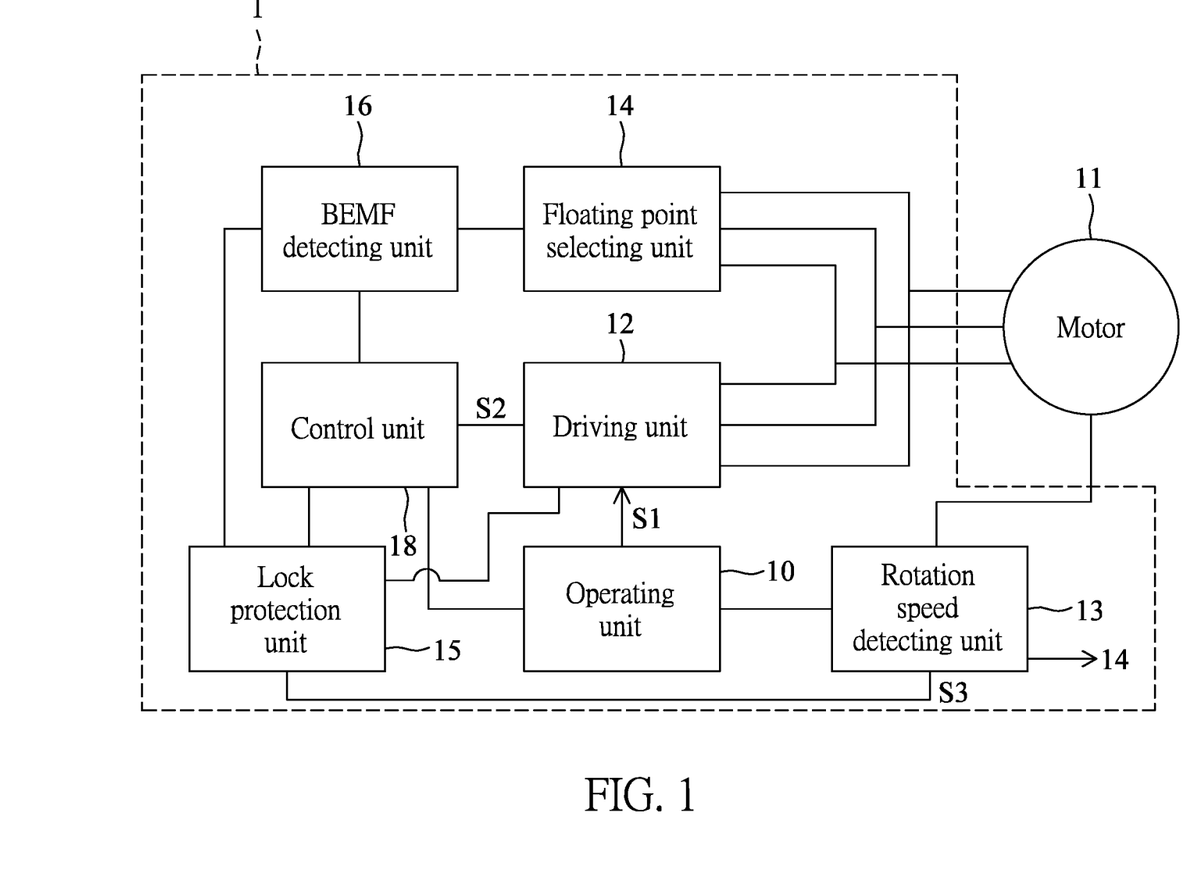
FIG. 1 is a circuit schematic diagram of a motor driving device having a lock protection mode according to a first embodiment of the present disclosure.

Reference is made to FIG. 1. FIG. 1 is a circuit schematic diagram of a motor driving device having a lock protection mode according to a first embodiment of the present disclosure.

As shown in FIG. 1, the first embodiment of the present disclosure provides a motor driving device 1 having a lock protection mode for driving a motor 11, and the motor driving device 1 includes a rotation speed detecting unit 13, an operating unit 10, a driving unit 12, a floating point selecting unit 14, a back electromotive force (BEMF) detecting unit 16, a control unit 18, and a lock protection unit 15. The motor 11 can be a three-phase sensorless motor.

The rotation speed detecting unit 13 is configured to detect a rotation speed of the motor 11, and the operating unit 10 is coupled to the rotation speed detecting unit 13 and configured to enter an operating mode after the rotation speed detecting unit 13 detects that the motor 11 is stably operated. The operating unit 10 generates an operating signal S1 having a plurality of phases according to a commutation sequence, and the commutation sequence is set according to a predetermined rotation direction of the motor 11.

The driving unit 12 is coupled to the operating unit 10 and the motor 11, and configured to drive the motor 11 with the plurality of phases when receiving the operating signal S1.

Figure 2:
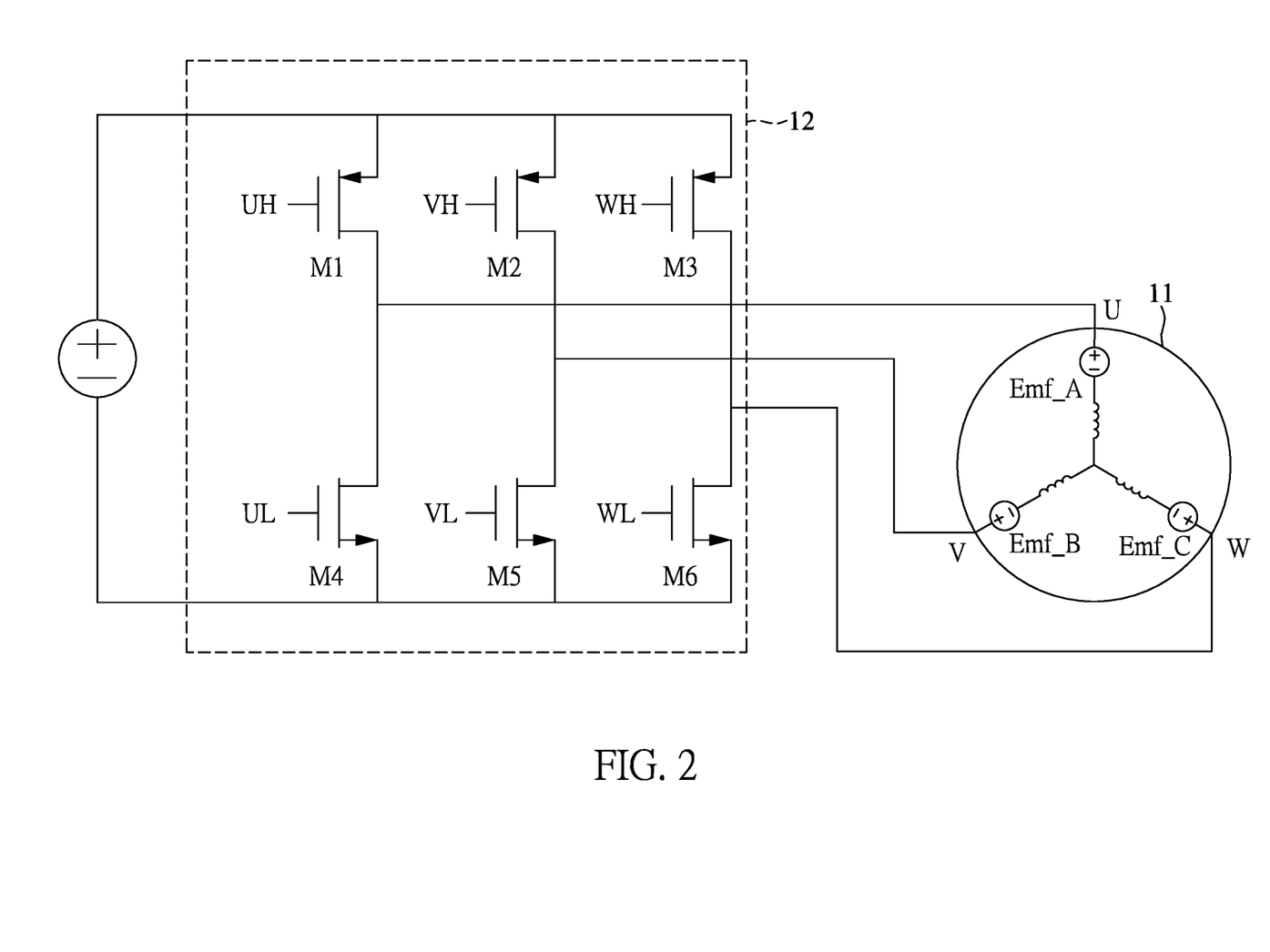
FIG. 2 is a circuit schematic diagram of a motor and a driving unit according to the first embodiment of the present disclosure.

Reference is made to FIG. 2, which is a circuit schematic diagram of a motor and a driving unit according to the first embodiment of the present disclosure. The driving unit 12 can receive the operating signal S1 to output the switching signals UH, UL, VH, VL, WH, and WL, respectively, to control ON or OFF states of respective switching elements in the driving unit 12.

In general, the motor 11 has three windings, which are a U coil winding U, a V coil winding V, and a W coil winding W. As can be seen from a circuit architecture of FIG. 2, the driving unit 12 includes transistors M1, M2, M3, M4, M5, and M6. When the transistor M1 and the transistor M5 are turned on, a current of the motor 11 is operated by the power source through the transistor M1. The current for driving the motor 11 operated flows from the power supply terminal, through the transistor M1, the U coil winding U, and the V coil winding V of the motor 11, and then flows to the ground terminal through the transistor M5.

Generally, the current for controlling a common motor flows from the U coil winding to the V coil winding V, the U coil winding U to the W coil winding W, and then changes a flow direction of the current to flowing from the V coil winding V to the W coil winding W, the V coil winding V to the U coil winding U, and the V coil winding V to the W coil winding W. Next, other phase changes continuously control the flow direction of the current of the U coil windings U, the V coil winding V, the W coil winding W, thereby controlling a rotation direction of the motor. The phase change of the motor is described in the above embodiment, however, this is only one kind of motor phase changing method, other phase changing methods of the motor will not be described herein.

Furthermore, the commutation sequence can be a sequentially arranged UV, UW, VW, VU, WU, and WV. According to this commutation sequence, the operating unit 10 can generate an operating signal S1 having multiple phases, and the commutation sequence UV, UW, VW, VU, WU, and WV are set according to a predetermined rotation direction of the motor, such as a forward rotation direction. When the U coil winding U serves as the floating phase, a BEMF generated thereby is Emf_A, when the V coil winding V serves as the floating phase, a BEMF generated thereby is Emf_B, and when the W coil winding W serves as the floating phase, a BEMF generated thereby is Emf_C.

Further, the floating point selecting unit 14 is coupled to the driving unit 12 and the motor 11 for selecting a floating phase that is not turned on in the motor 11 according to a driving condition of the driving unit 12. For example, in a case of UV in the commutation sequence, that is, the U coil winding U and the V coil winding V are turned on, and at this time, the floating phase that is not turned on in the motor 11 is the W coil winding W. In a case of UW in the commutation sequence, that is, the U coil winding U and the W coil winding W are turned on, and at this time, the floating phase that is not turned on in the motor 11 is the V coil winding V.

When the motor 11 enters an operation mode after being stably operated, in order to reduce noises, the original way of detecting the plurality of floating phases is changed to detecting only one of floating phases to reduce current discontinuity points. In detail, the floating point selecting unit 14 selects one of the phase circuits of the motor 11 as a first floating phase.

Further, the BEMF detecting unit 16 is coupled to the floating point selecting unit 14 and configured to detect whether the BEMF of the first floating phase has a first voltage level or a second voltage level to generate a detection result. For example, in a case of UV in the commutation sequence, that is, the U coil winding U and the V coil winding V are turned on, and the BEMF detecting unit 16 can be set to detect one of the floating phases of the motor, such as the coil winding W, to determine whether the selected floating phase has a first voltage level or a second voltage level corresponding to the commutation sequence. The first voltage level may be a high potential greater than 0, and the second voltage level may be a low potential less than 0, thereby generating the detection result.

Furthermore, the control unit 18 is coupled to the BEMF detecting unit 16 and the driving unit 12 and configured to control, according to the commutation sequence such as the commutation sequence UV, UW, VW, VU, WU, and WV, the BEMF detecting unit 16 to detect the BEMF of the floating phase to determine whether the BEMF has the first voltage level or the second voltage level, and output a commutation signal S2 to the driving unit 12 according to the detection result.

After the motor 11 is driven by a first phase of the operating signal S1. For example, the first phase may be a switching signal for controlling the U coil winding U and the V coil winding V to be turned on, and the BEMF detecting unit 16 detects whether the BEMF of the floating phase (in this case, the BEMF Emf_C) has a second voltage level, and if so, the detection result is generated, and the control unit 18 is configured to output the commutation signal S2 to the driving unit 12.

When the driving unit 12 receives the commutation signal S2, the motor 11 can be driven by a second phase after the first phase according to the commutation sequence. For example, when the first phase is a switching signal that controls the U coil winding U and the V coil winding V to be turned on, the second phase is a switching signal that controls the U coil winding U and the W coil winding W to be turned on according to the commutation sequence UV, UW, VW, VU, WU, and WV. Next, the control unit 18 controls the BEMF detecting unit 16 to detect whether a voltage of the BEMF (in this case, the BEMF Emf_B) of the floating phase (in this case, V) has the first voltage level, and if so, the detection result is generated. The control unit 18 is configured to output the commutation signal S2 to the driving unit 12 according to the detection result. More specifically, the control unit 18 determines, according to the commutation sequence, that the first voltage level or the second voltage level (for example, a high voltage level greater than 0 or a low voltage level less than 0) should be detected by the BEMF detecting unit 16. For example, depending on the commutation sequence UV and UW, and a tendency of the BEMFs expected to be generated on the U coil winding U, the V coil winding V, and the W coil winding W, the BEMF detecting unit 16 can determine to detect the second voltage level (a low voltage level less than 0) during the commutation sequence UV.

Thereafter, taking a three-phase sensorless motor as an example, three phases of six steps as a cycle are used to drive the motor 11, while a high voltage level or a low voltage level of the BEMF of one of the floating phases is detected as a reference for the commutation.

In addition, the lock protection unit 15 is configured to control the driving unit 12 to enter the lock protection mode in response to a switching signal S3 being received. In the lock protection mode, the driving unit 12 is controlled to repeatedly drive and stop the motor 11, so as to try to push the motor 11 while ensuring that a temperature of the motor 11 varies within a safe range to avoid damage to the motor 11 caused by overheating.

Conditions and time points for switching to the lock protection mode are explained hereinafter. In detail, the rotation speed detecting unit 13 can further determine whether the rotation speed of the motor 11 exceeds a predetermined rotation speed. When the rotation speed detecting unit 13 determines that the rotation speed of the motor 11 exceeds the predetermined rotation speed, two operation modes can be performed. First, the rotation speed detecting unit 13 can output the switching signal S3 to the lock protection unit 15, so that the lock protection unit 15 directly controls the driving unit 12 to enter the lock protection mode to control the driving unit 12 to repeatedly drive and stop the motor 11 to attempt to drive the motor 11 while ensuring that the temperature of the motor 11 varies within a safe range to avoid damage to the motor 11 caused by overheating.

Secondly, the rotation speed detecting unit 13 can control the floating point selecting unit 14 to select the first phase circuit and the second phase circuit of the motor 11 as the first floating phase and the second floating phase. For example, the floating point selecting unit 14 may select the U coil winding U and the W coil winding W, and the BEMF detecting unit 16 may detect the BEMFs of the first floating phase and the second floating phase to determine whether to output the switching signal S3 to the lock protection unit 15, causing the driving unit 12 to enter the lock protection mode. When the motor is affected by an external force to be locked in a certain position, due to a magnetic circuit present between a rotor and a stator of the motor 11, the floating phase may induce an erroneous BEMF, thereby causing the BEMF detecting circuit 16 to misjudge that the motor 11 is continuously rotating, and a lock protection mechanism cannot be performed, causing coils of the motor 11 to overheat. Therefore, the purpose of the lock protection mode is that, when the floating point selection unit 14 selects two of the phase circuits of the detection motor 11, even if one of them meets the voltage level corresponding to the commutation sequence, the other floating phase cannot be detected to have the voltage level corresponding to the corresponding commutation sequence, and thus it can be correctly determined whether the motor is continuously rotating.

Therefore, when one of the selected floating phases does not meet the voltage level corresponding to the commutation sequence, the switching signal S3 can be generated to cause the lock protection unit 15 to control the driving unit to enter the lock protection mode. In the lock protection mode, the driving unit 12 is controlled to repeatedly drive and stop the motor 11, so as to try to push the motor 11 while ensuring that a temperature of the motor 11 varies within a safe range to avoid damage to the motor 11 caused by overheating.

In certain embodiments, the BEMF detecting unit 16 can be a hysteresis comparator configured to detect whether the BEMF of the first floating phase or the second floating phase is greater than a positive value of a hysteresis voltage or less than a negative value of the hysteresis voltage to generate a high voltage level or a low voltage level.

For example, the control unit 18 can set the hysteresis comparator to the first voltage level according to the commutation sequence UV, UW, VW, VU, WU, and WV, thereby determining whether the BEMF of the floating phase is smaller than the negative value of the hysteresis voltage, or the control unit 18 can set the hysteresis comparator to the second voltage level to determine whether the back electromotive force of the set floating phase is greater than the positive value of the hysteresis voltage.

In detail, during the commutation sequence UV, the control unit 18 can set the hysteresis comparator to the high voltage level. At this time, the hysteresis comparator detects whether the BEMF of the first floating phase (at this time, the BEMF is the BEMF Emf_C of the W coil winding W) is less than the negative value of the hysteresis voltage. During the commutation sequence UW, the control unit 18 can set the hysteresis comparator to the low voltage level. At this time, the hysteresis comparator detects whether the BEMF of the second floating phase (at this time, the BEMF is the BEMF Emf_B of the V coil winding V) is greater than the positive value of the hysteresis voltage. In this way, it is possible to avoid a situation in which the comparator misjudges the voltage level of the BEMF as a result of being interfered by a small disturbance of the voltage, thereby improving the accuracy of the detection.

In some embodiments, when the hysteresis comparator is set to the first voltage level to determine whether the BEMF of the floating phase is smaller than the negative value of the hysteresis voltage, if the BEMF of the first floating phase is determined to be smaller than the negative value of the hysteresis voltage, the hysteresis comparator generates the low voltage level as the detection result. Alternatively, the hysteresis comparator can be set to the first voltage level and determine whether the BEMF of the second floating phase is less than the negative value of the hysteresis voltage for determining whether to enter the lock protection mode.

On the other hand, when the hysteresis comparator is set to the second voltage level to determine whether the BEMF of the first floating phase is larger than the positive value of the hysteresis voltage, if the BEMF of the first floating phase is determined to be is larger than the positive value of the hysteresis voltage, the hysteresis comparator generates the high voltage level as the detection result, thereby generating the commutation signal. Alternatively, the hysteresis comparator can be set to the second voltage level and determine whether the BEMF of the second floating phase is greater than the positive value of the hysteresis voltage for determining whether to enter the lock protection mode.

Therefore, the motor driving device having the lock protection mode provided by the first embodiment of the present disclosure can directly enter the lock protection mode when the rotation speed exceeds the predetermined rotation speed to control the driving unit to repeatedly drive and stop the motor, so as to try to push the motor to be unlocked, while ensuring that a temperature of the motor varies within a safe range to avoid damage to the motor caused by overheating. Alternatively, the floating point selecting unit can be controlled to select two of the phase circuits of the motor to be detected, thereby correctly determining whether the motor is locked to determine whether to enter the lock protection mode.

Figure 3:
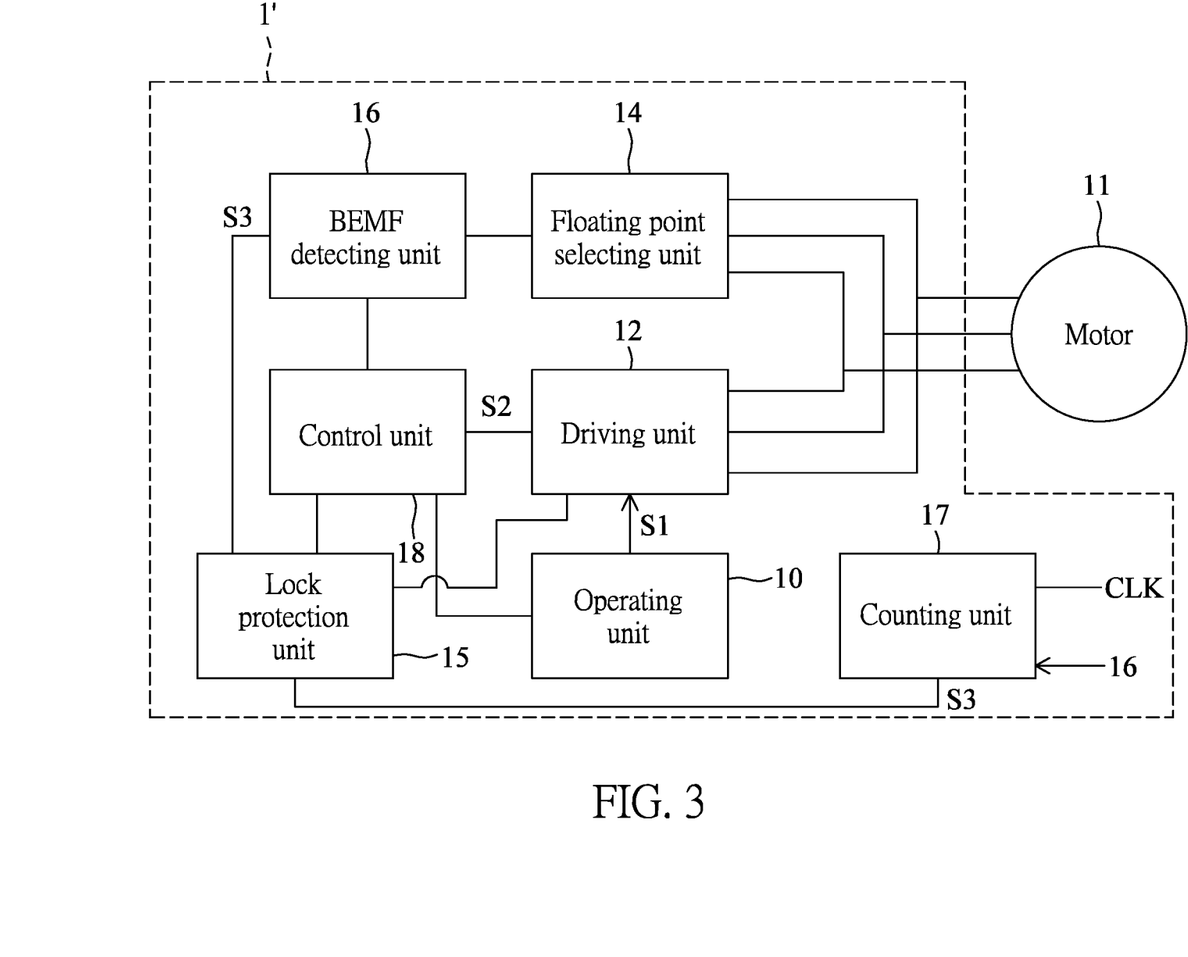
FIG. 3 is a circuit schematic diagram of a motor driving device having a lock protection mode according to a second embodiment of the present disclosure.

Reference is made to FIG. 3, which is a circuit schematic diagram of a motor driving device having a lock protection mode according to a second embodiment of the present disclosure.

The second embodiment of the present disclosure further provides a motor driving device 1' having a lock protection mode for driving a motor 11, and the motor driving device 1' includes a rotation speed detecting unit 13, an operating unit 10, a driving unit 12, a floating point selecting unit 14, a back electromotive force (BEMF) detecting unit 16, a control unit 18, a lock protection unit 15 and a counting unit 17.

Operations of the rotation speed detecting unit 13, the operating unit 10, the driving unit 12, the floating point selecting unit 14, and the BEMF detecting unit 16 in this embodiment are similar to those disclosed in the first embodiment of the present disclosure, and descriptions thereof are omitted hereinafter.

Differences from the first embodiment are that the control unit 18 of the second embodiment further controls the BEMF detecting unit 16 to detect the BEMF of the first floating phase after the commutation signal S2 is generated and a mask time elapses. The mask time is designed to avoid misjudgment of a BEMF voltage level when the floating phase is switched and the stable voltage is not reached.

Similarly, the lock protection unit 15 is configured to control the driving unit 12 to enter the lock protection mode in response to the switching signal S3 being received. In the lock protection mode, the driving unit 12 is controlled to repeatedly drive and stop the motor 11, so as to try to push the motor 11 while ensuring that a temperature of the motor 11 varies within a safe range to avoid damage to the motor 11 caused by overheating.

The motor driving device 1' of the present embodiment further includes the counting unit 17 configured to increase a count value by 1 when the BEMF detecting unit 16 detects that the commutation signal S2 is generated within a predetermined time after a masking time MSK elapses.

Figure 4A:
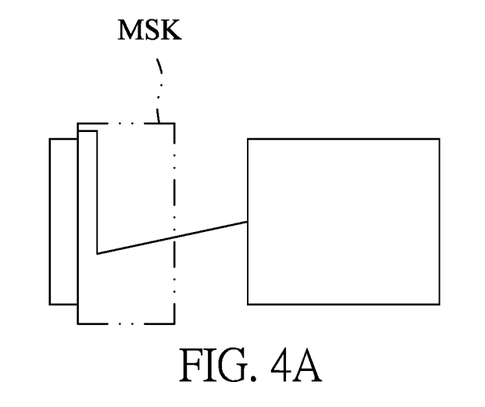
FIGS. 4A to 4C are schematic diagrams showing a mask time and motor driving signals according to the second embodiment of the present disclosure.
Figure 4B:
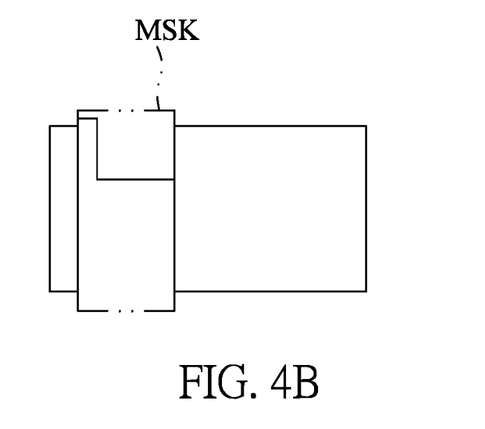
Figure 4C:
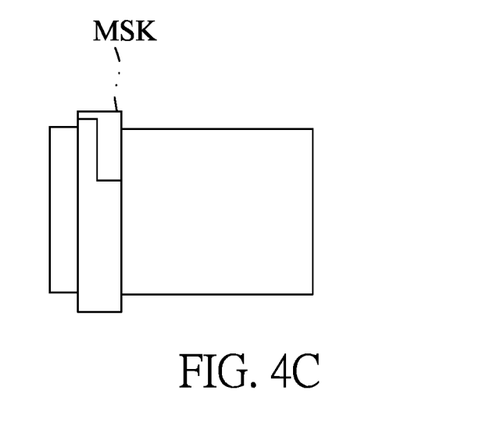

Reference is made to FIGS. 4A to 4C, which are schematic diagrams showing a mask time and motor driving signals according to the second embodiment of the present disclosure. In other words, there is usually still a period of time after an end of the mask time MSK, and the mask time MSK actually decreases if the rotation speed increases. If the mask time MSK elapses and the BEMF detecting unit 16 always immediately detects a predetermined voltage level corresponding to the commutation sequence in the first floating phase for a period of time, the motor may already be in a lock condition.

Therefore, the counting unit 17 is configured to count, and if the count value is added to a predetermined count value within a predetermined time, two operation modes can be performed. Similarly, the rotation speed detecting unit 13 can output the switching signal S3 to the lock protection unit 15, so that the lock protection unit 15 directly controls the driving unit 12 to enter the lock protection mode to control the driving unit 12 to repeatedly drive and stop the motor 11 to attempt to push the motor 11 while ensuring that a temperature of the motor 11 varies within a safe range to avoid damage to the motor 11 caused by overheating.

Secondly, the rotation speed detecting unit 13 can control the floating point selecting unit 14 to select the first phase circuit and the second phase circuit of the motor 11 as the first floating phase and the second floating phase. For example, the floating point selecting unit 14 may select the U coil winding U and the W coil winding W, and the BEMF detecting unit 16 may detect the BEMFs of the first floating phase and the second floating phase to determine whether to output the switching signal S3 to the lock protection unit 15, causing the driving unit 12 to enter the lock protection mode. When the motor is affected by an external force to be locked in a certain position due to a magnetic circuit present between a rotor and a stator of the motor 11, the floating phase may induce an erroneous BEMF, thereby causing the BEMF detecting circuit 16 to misjudge that the motor 11 is continuously rotating, and the lock protection mechanism cannot be performed, causing the coils of the motor 11 to overheat. Therefore, the purpose of the lock protection mode is that, when the floating point selection unit 14 selects two of the phase circuits of the detection motor 11, even if one of them meets the voltage level corresponding to the commutation sequence, the other floating phase cannot be detected to have the voltage level corresponding to the corresponding commutation sequence, and thus it can be correctly determined whether the motor is continuously rotating.

Therefore, when one of the selected floating phases does not meet the voltage level corresponding to the commutation sequence, the switching signal S3 can be generated to cause the lock protection unit 15 to control the driving unit to enter the lock protection mode. In the lock protection mode, the driving unit 12 is controlled to repeatedly drive and stop the motor 11, so as to try to push the motor 11 while ensuring that a temperature of the motor 11 varies within a safe range to avoid damage to the motor 11 caused by overheating.

Similarly, in this embodiment, the BEMF detecting unit 16 can also be a hysteresis comparator configured to detect whether the BEMF of the first floating phase or the second floating phase is greater than a positive value of a hysteresis voltage or less than a negative value of the hysteresis voltage to generate a high voltage level H or a low voltage level L for indicating a detection result. Implementations of the BEMF detecting unit 16 have been described in the first embodiment, and can also be applied to the BEMF detecting unit 16 of the present embodiment, and descriptions thereof are omitted hereinafter.

It should be noted that the counting unit 17 can be configured to receive a clock signal CLK. The clock signal CLK can be generated by a clock generating unit, or by a pulse-width modulation (PWM) signal generator built in the motor driving device. The counting unit 17 can use a period of the clock signal CLK (for example, the period of the clock signal CLK in which one cycle is defined from a high level to a low level) after the mask time MSK elapses as the predetermined time, or in some embodiments, when the pulse signal CLK is the PWM signal, the counting unit 17 can use a time duration from the end of the mask time MSK to a first appearing rising edge or a first appearing falling edge as the predetermined time. However, the present disclosure is not limited thereto.

Therefore, the motor driving device having the lock protection mode provided by the second embodiment of the present disclosure can determine whether the motor is in the lock condition by the counting unit and a setting of the mask time so as to improve an accuracy of a determination, while allowing a user to set the predetermined time in different ways, thereby directly entering the lock protection mode when the rotation speed exceeds the predetermined rotation speed, so as to control the driving unit to repeatedly drive and stop the motor, and attempt to push the motor to be unlocked, while ensuring that a temperature of the motor varies within a safe range to avoid damage to the motor caused by overheating. Alternatively, the floating point selecting unit can be controlled to select two of the phase circuits of the motor to be detected, thereby correctly determining whether the motor is locked to determine whether to enter the lock protection mode.

In conclusion, the motor driving device having the lock protection mode provided by the present disclosure can directly enter the lock protection mode when the rotation speed exceeds the predetermined rotation speed to control the driving unit to repeatedly drive and stop the motor, so as to try to push the motor to be unlocked, while ensuring that a temperature of the motor varies within a safe range to avoid damage to the motor caused by overheating. Alternatively, the floating point selecting unit can be controlled to select two of the phase circuits of the motor to be detected, thereby correctly determining whether the motor is locked to determine whether to enter the lock protection mode.

In addition, the counting unit and the setting of the mask time can be used to determine whether the motor is in the lock condition to improve the accuracy of the determination, while allowing the user to set the predetermined time in different ways to improve flexibility of an applicability of the system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driving device having a lock protection mode for driving a motor, comprising:
    a rotation speed detecting unit configured to detect a rotation speed of the motor;
    an operating unit configured to enter an operating mode after the rotation speed detecting unit detects that the motor is continuously rotated at the rotation speed, wherein the operating unit generates an operating signal having a plurality of phases according to a commutation sequence, and the commutation sequence is set according to a predetermined rotation direction of the motor;
    a driving unit coupled to the operating unit and the motor and configured to drive the motor with the plurality of phases;

a floating point selecting unit coupled to the driving unit and the motor, and configured to select a first phase circuit of the motor as a first floating phase in the operating mode;

a back electromotive force (BEMF) detecting unit coupled to the floating point selecting unit and configured to detect whether a back electromotive force (BEMF) of the first floating phase has a first voltage level or a second voltage level to generate a detection result;

a control unit coupled to the BEMF detecting unit and the driving unit and configured to output a commutation signal to the driving unit according to the detection result, thereby causing the driving unit to drive the motor according to the commutation sequence and the commutation signal; and a lock protection unit configured to control the driving unit to enter the lock protection mode in response to receiving a switching signal;

wherein the rotation speed detecting unit is configured to determine whether the rotation speed of the motor exceeds a predetermined rotation speed; and the rotation speed detecting unit is configured to output, in response to the rotation speed of the motor exceeding the predetermined rotation speed, the switching signal to the lock protection unit, causing the driving unit to enter the lock protection mode, or control the floating point selecting unit to select the first phase circuit and a second phase circuit of the motor as the first floating phase and a second floating phase; and the BEMF detecting unit is configured to detect the BEMFs of the first floating phase and the second floating phase to determine whether to output the switching signal to the lock protection unit to cause the driving unit to enter the lock protection mode, and wherein in the lock protection mode, the driving unit repeatedly drives and stops the motor.

2. The motor driving device according to claim 1, wherein the BEMF detecting unit is configured to detect, in response to the rotation speed detecting unit determining that the rotation speed of the motor exceeds the predetermined rotation speed, whether the BEMFs of the first floating phase and the second floating phase have the first voltage level or the second voltage level corresponding to the commutation sequence, and the BEMF detecting unit is configured to, in response to the BEMFs of the first floating phase and the second floating phase not having the first voltage level or the second voltage level corresponding to the commutation sequence, determine to output the switching signal to the lock protection unit to cause the driving unit to enter the lock protection mode.

3. The motor starting device according to claim 1, wherein the BEMF detecting unit includes a hysteresis comparator configured to detect whether the BEMF of the first floating phase or the second floating phase is greater than a positive value of a hysteresis voltage or less than a negative value of the hysteresis voltage to generate a high voltage level or a low voltage level.

4. The motor driving device according to claim 2, wherein the control unit is configured to set a hysteresis comparator to the first voltage level according to the commutation sequence of the plurality of phases to determine whether the BEMF of the first floating phase or the second floating phase is smaller than a negative value of a hysteresis voltage; or the control unit is configured to set the hysteresis comparator to the second voltage level to determine whether the BEMF of the first floating phase or the second floating phase is greater than a positive value of the hysteresis voltage.

5. The motor driving device according to claim 3, wherein when the hysteresis comparator is set to the first voltage level and configured to determine whether the BEMF of the first floating phase or the second floating phase is less than the negative value of the hysteresis voltage, if the BEMF of the first floating phase or the second floating phase is determined to be less than the negative value of the hysteresis voltage, the hysteresis comparator is configured to generate the low voltage level.

6. The motor driving device according to claim 4, wherein when the hysteresis comparator is set to the second voltage level and configured to determine whether the BEMF of the first floating phase or the second floating phase is greater than the positive value of the hysteresis voltage, if the BEMF of the first floating phase or the second floating phase is determined to be greater than the positive value of the hysteresis voltage, the hysteresis comparator is configured to generate the high voltage level.

7. A motor driving device having a lock protection mode for driving a motor, comprising:

a rotation speed detecting unit configured to detect a rotation speed of the motor;

an operating unit configured to enter an operating mode after the rotation speed detecting unit detects that the motor is continuously rotated at the rotation speed, wherein the operating unit generates an operating signal having a plurality of phases according to a commutation sequence, and the commutation sequence is set according to a predetermined rotation direction of the motor;

a driving unit coupled to the operating unit and the motor and configured to drive the motor with the plurality of phases;

a floating point selecting unit coupled to the driving unit and the motor, and configured to select a first phase circuit of the motor as a first floating phase in the operating mode;

a back electromotive force (BEMF) detecting unit coupled to the floating point selecting unit and configured to detect whether a back electromotive force (BEMF) of the first floating phase has a first voltage level or a second voltage level to generate a detection result;

a control unit coupled to the BEMF detecting unit and the driving unit and configured to output a commutation signal to the driving unit according to the detection result, thereby causing the driving unit to drive the motor according to the commutation sequence and the commutation signal, wherein the control unit is configured to control the BEMF detecting unit to detect the BEMF of the first floating phase after the commutation signal is generated and a mask time elapses;

a lock protection unit configured to control the driving unit to enter the lock protection mode in response to receiving a switching signal; and a counting unit configured to:

increase a count value when the BEMF detecting unit detects that the commutation signal is generated within a predetermined time after the mask time elapses; and output the switching signal to the lock protection unit in response to the count value being added to a predetermined value to cause the driving unit to enter the lock protection mode, or control the floating point selecting unit to select the first phase circuit and a second phase circuit of the motor as the first floating phase and a second floating phase, wherein the BEMF detecting unit is configured to detect the BEMFs of the first floating phase and the second floating phase to determine whether to output the switching signal to the lock protection unit, causing the driving unit to enter the lock protection mode, and wherein in the lock protection mode, the driving unit repeatedly drives and stops the motor.

8. The motor driving device according to claim 7, wherein when the count value is added to a predetermined count value, the BEMF detecting unit is configured to detect whether the BEMFs of the first floating phase and the second floating phase have the first voltage level or the second voltage level corresponding to the commutation sequence, and the BEMF detecting unit is configured to, in response to the BEMFs of the first floating phase and the second floating phase not having the first voltage level or the second voltage level corresponding to the commutation sequence, determine to output the switching signal to the lock protection unit to cause the driving unit to enter the lock protection mode.

9. The motor starting device according to claim 7, wherein the BEMF detecting unit includes a hysteresis comparator configured to detect whether the BEMF of the first floating phase or the second floating phase is greater than a positive value of a hysteresis voltage or less than a negative value of the hysteresis voltage to generate a high voltage level or a low voltage level.

10. The motor starting device according to claim 9, wherein the control unit is configured to set the hysteresis comparator to the first voltage level according to the commutation sequence of the plurality of phases to determine whether the BEMF of the first floating phase or the second floating phase is smaller than the negative value of the hysteresis voltage; or the control unit is configured to set the hysteresis comparator to the second voltage level to determine whether the BEMF of the first floating phase or the second floating phase is greater than the positive value of the hysteresis voltage.

11. The motor driving device according to claim 10, wherein when the hysteresis comparator is set to the first voltage level and configured to determine whether the BEMF of the first floating phase or the second floating phase is less than the negative value of the hysteresis voltage, if the BEMF of the first floating phase or the second floating phase is determined to be less than the negative value of the hysteresis voltage, the hysteresis comparator is configured to generate the low voltage level.

12. The motor driving device according to claim 11, wherein when the hysteresis comparator is set to the second voltage level and configured to determine whether the BEMF of the first floating phase or the second floating phase is greater than the positive value of the hysteresis voltage, if the BEMF of the first floating phase or the second floating phase is determined to be greater than the positive value of the hysteresis voltage, the hysteresis comparator is configured to generate the high voltage level.

13. The motor driving device according to claim 7, wherein the counting unit is configured to receive a clock signal, and use a period of the clock signal as the predetermined time after the mask time elapses.

14. The motor driving device according to claim 7, wherein the counting unit is configured to receive a clock signal, and use a time duration from an end of the mask time to a first rising edge or a first falling edge appearing in the clock signal as the predetermined time.

* * * * *